Nov. 22, 1960    B. W. SZNYCER    2,960,883
BELT TRANSMISSION
Filed May 3, 1957

INVENTOR.
BERNARD W. SZNYCER
BY Mauro & Lewis
ATTY'S.

United States Patent Office 2,960,883
Patented Nov. 22, 1960

2,960,883
BELT TRANSMISSION

Bernard W. Sznycer, New York, N.Y., assignor to Omega Aircraft Corporation, New York, N.Y., a corporation of New York Filed May 3, 1957, Ser. No. 656,902

4 Claims. (Cl. 74—242.12)

In a single rotor helicopter of my design, one of the objects is to drive the rotor by twin engines with suitable declutching means so that the rotor may be driven by one engine upon failure of the other.

Another object of my helicopter design is to simplify construction details throughout and to provide each component of the machine in a form subject to easy repair, adjustment and replacement.

In connecting dual engines with the single rotor shaft, it was recognized that a conventional gear train drive for each motor connected to a single gear box at the rotor would result in a system producing excessive vibration and conducive to fatigue failures. It was further recognized that the provision of belt drives would introduce a highly desirable damping effect provided suitable transmissions could be designed.

Accordingly, an object of the present invention is the provision of a belt transmission especially suitable for use with the machine above described.

Another object is to provide a belt transmission constructed in a unit which can readily be adjusted on, or removed from, its supporting framework.

Other objects will be apparent from a description of the drawing, wherein.

Figure 1:
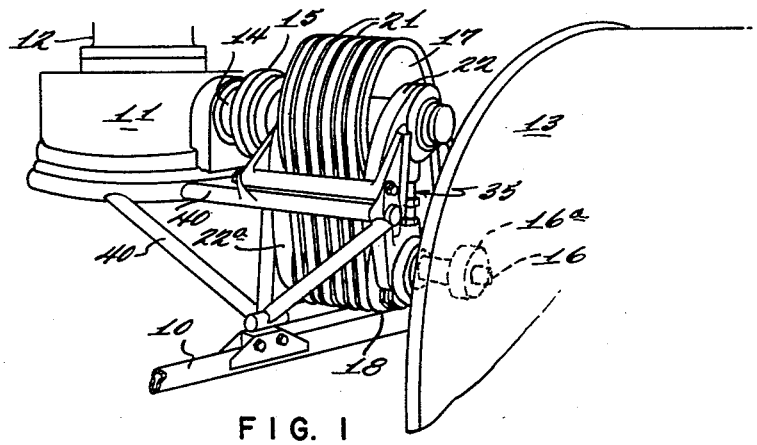
Fig. 1 is a fragmentary elevation of a belt transmission made according to the invention shown in operative position on the frame of a helicopter fuselage mounted between an engine and the rotor housing.

In Fig. 1, the frame member 10 depicts one of the upper side frame elements of a helicopter fuselage. The housing 11 encloses driving means, such as a spiral bevel gear, for turning the rotor hub or shaft 12. The cowling of a suitable motor is partially shown at 13. Support means for the motor such as lateral frame members extending from frame 10, are omitted.

A driven shaft 14 extends laterally from housing 11, wherein it may be connected to the spiral bevel gear of rotor hub 12 by means of a spiral bevel pinion. Shaft 14 is interrupted by a flexible coupling 15 of any suitable type which may be disconnected with ease. The drive shaft 16 of the motor is likewise interrupted by another flexible coupling which may be a constant velocity universal joint indicated generally at 16a. A ratchet-jaw-clutch may also be interposed between motor and belt transmission in the dual motor system described above, to permit one motor to drive the rotor hub 12 in case of failure of the other motor.

Motor 13 is mounted to frame 10 in such manner that shaft 16 is in parallel but offset or spaced beneath shaft 14.

Figures 2, 3:
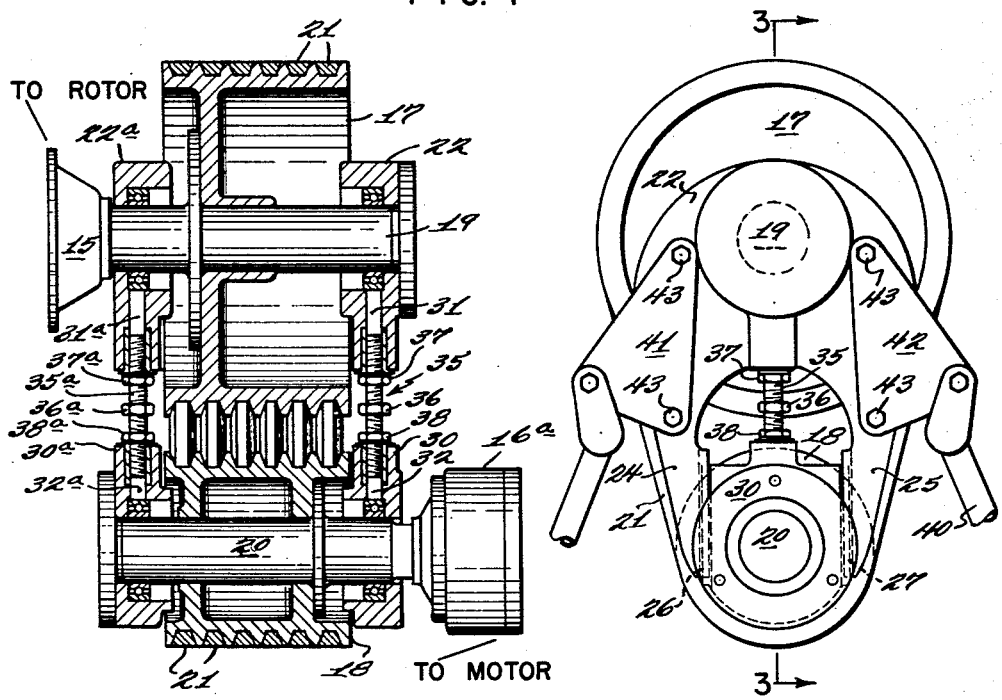
Fig. 2 is an end elevation of the belt transmission.
Fig. 3 is a sectional view through the unit, taken on lines 3—3, Fig. 2.

The belt drive unit, best seen in Figs. 3 and 4, consists of an upper pulley 17 and a lower pulley 18 mounted on shafts 19 and 20 respectively. A plurality of belts 21 connect the pulleys 17—18.

Shafts 19—20 carrying pulleys 17—18 are journalled at either end in a pair of adjustable housings 22 and 22a. From Fig. 2 it will be noted that housing 22 is formed in the shape of an inverted yoke having two depending sides 24—25 between which are formed key-ways 26—27 in which is slidably located the lower housing segment 30 containing the bearing for shaft 20 carrying pulley 18.

As seen in Fig. 3, housing members 22 and 30 are provided with internally threaded bores 31—32 on a common axis, oppositely threaded, to receive the opposite ends of an adjusting screw 35, having an adjusting bolt 36 at its midsection and being oppositely threaded at either side of bolt 36. Lock nuts 37—38 lock screw 35 in the selected position. Housing 22a is similarly constituted and corresponding parts thereof carry an "a" designator and are similarly numbered to match those elements of housing 22 just described.

It will appear from the foregoing that pulley 18 is adjustable relative to pulley 17 by operation of the adjusting screws 35—35a. Rotation in one direction of screws 35—35a will apply tension to belts 21 by forcing pulley 18 away from pulley 17; opposite rotation of screws 35—35a will move pulley 18 closer to pulley 17 and slacken belts 21. This adjustment can be accomplished when the transmission unit is connected to, or disconnected from, shafts 14 and 16.

Adjusting means of the type described are highly advantageous in any belt drive unit carrying a heavy load. New belts, especially, tend to elongate during their early use and must be readjusted.

It will be further noted that housings 22—22a and their lower segments 30—30a are designed to height and width dimensions substantially less than the respective circumferences of pulleys 17 and 18. Accordingly, when operating adjusting screws 35—35a to reduce the pulley spacing no part of the housings impedes removal of the belts 21, when the unit is detached as shown in Fig. 3, and the belts 21 may be readily removed without disconnecting the pulleys or their housings in any way, or without prying or stretching the belts.

As seen in Figs. 1 and 2, the transmission unit when applied to a helicopter rotor may be mounted on a strut 40 which rigidly supports upper pulley shaft 19 in axial alignment with shaft 14 connecting with rotor hub 12. Carried by strut 40 are suitable mounting plates such as the plates 41—42, Fig. 2, to which the housing members 22—22a may be bolted, as by the four bolts 43.

Consequently, in order to remove the entire belt transmission unit from operative position all that is required is to disconnect the flexible couplings 15 and 16a and the bolts 43. The unit thus removed may therefore be readily overhauled or replaced with a spare of the same construction.

The foregoing specification discloses a belt drive transmission which, by way of example, is shown as applied to a helicopter drive. The transmission obviously has applications to other types of transmissions as will occur to those skilled in the art.

What is claimed is:

1. In a belt transmission of the type described, a supporting machine frame carrying spaced power transmitting shafts; a demountable belt drive unit, said unit consisting of a pair of pulleys each having a shaft, at least one belt connecting said pulleys, a housing for each pulley having a bearing for each pulley shaft, said pulley housings and said pulleys being held in selected spaced relationship to each other independently of said supporting machine frame by adjustable belt-tensioning means connecting one of said pulley housings to the other, said adjustable means including locking means maintaining said pulleys at the selected spacing; flexible detachable couplings connecting each pulley shaft to a power transmitting shaft, and other coupling means between said supporting machine frame and one of said pulley housings, disconnection of said other coupling means and of said flexible, detachable couplings resulting in the removal of said belt drive unit from said frame.

2. The invention according to claim 1, wherein the pulley housing means for the pulley shafts are shaped with perimeters less than the combined perimeters of the belt-supporting faces of the pulleys to facilitate belt removal.

3. The invention according to claim 1, wherein the pulley housing supporting one of said pulley shafts comprises a pair of members provided with keyways slidably meshing with keyways formed on the supporting housing for the second of said pulley shafts.

4. The invention according to claim 1, wherein the adjustable belt-tensioning means between the pulley housing means of each pulley shaft comprises screw means carrying the locking means, which consist of lock nuts.

References Cited in the file of this patent
UNITED STATES PATENTS

| | | |
|---|---|---|
| 1,805,326 | Bunker et al. | May 12, 1931 |
| 1,886,537 | Evans et al. | Nov. 8, 1932 |
| 2,497,623 | Nolen | Feb. 14, 1950 |
| 2,517,328 | Lownsbery | Aug. 1, 1950 |
| 2,551,821 | Bengtson | May 8, 1951 |
| 2,600,643 | Hagelgantz | June 17, 1952 |
| 2,799,176 | Rieser | July 16, 1957 |

FOREIGN PATENTS

| | | |
|---|---|---|
| 437,945 | Germany | Nov. 30, 1926 |
| 673,897 | France | Oct. 14, 1929 |